Patented Nov. 17, 1953

2,659,719

UNITED STATES PATENT OFFICE 2,659,719

2-AMINO-5-NITROTHIAZOLE AZO DYE COMPOUNDS

Joseph B. Dickey and Edmund B. Towne, Kingsport, Tenn., assignors to Eastman Kodak Company, Rochester, N. Y., a corporation of New Jersey No Drawing. Application June 23, 1951,
Serial No. 233,243

9 Claims. (Cl. 260—158)

This invention relates to new azo compounds and their application to the art of dyeing or coloring.

It is known that cellulose acetate can be colored blue shades by azo compounds having the general formula:

I.
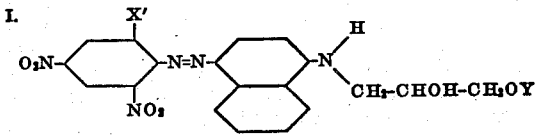

wherein X' represents a chlorine atom or a bromine atom and Y represents a hydrogen atom or a methyl group. However, these compounds dye slowly, are difficult to disperse, have poor color value at high concentrations and have poor gas fastness properties. Additionally, it is difficult to obtain level dyeings with them.

It is also known that cellulose acetate can be colored blue shades by azo compounds having the general formula:

II.
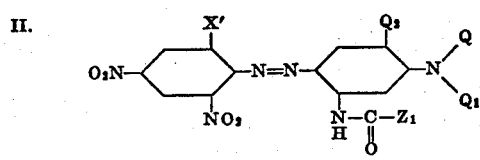

wherein X' represents a chlorine atom or a bromine atom, Q and $Q_1$ each represents a radical such as a methyl group, an ethyl group, a propyl group, a butyl group, a β-hydroxyethyl group, a β,γ - dihydroxypropyl group, a β - hydroxy - γ- alkoxypropyl group or a γ-hydroxypropyl group and wherein Q may also be a hydrogen atom, $Q_2$ represents a methoxy group, an ethoxy group, a propoxy group or a butoxy group, and $Z_1$ represents a hydrogen atom, a methyl group, an ethyl group, a propyl group or a β-hydroxyethyl group. These compounds dye cellulose acetate slowly, are difficult to disperse and have poor color value at high concentrations. Further, it is difficult to obtain level dyeings with them.

Blue shades on cellulose acetate can also be obtained with the azo compounds having the general formula:

III.
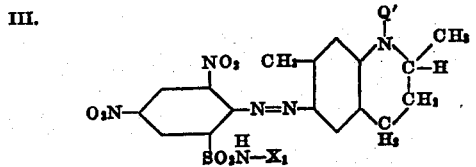

wherein Q' represents a hydroxyalkyl group such as β-hydroxyethyl, β,γ-dihydroxypropyl, β-hydroxypropyl or γ-hydroxypropyl and $X_1$ represents an alkyl group such as a methyl group or an ethyl group. These compounds, however, dye slowly and it is difficult to obtain level dyeings with them.

Shades of blue can also be obtained on cellulose acetate with the azo compounds having the general formula:

IV.
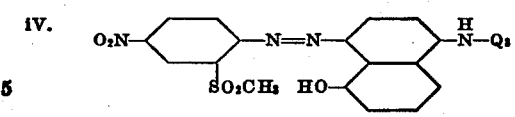

wherein $Q_3$ represents a hydrogen atom or hydroxyalkyl group such as β-hydroxyethyl, β-hydroxypropyl, γ-hydroxypropyl or β,γ-dihydroxypropyl. These compounds have poor light and gas fastness properties.

Additionally, it is known that blue or bluish-green shades can be obtained on cellulose acetate with the azo compounds obtained from diazotized 2-aminobenzothiazole, diazotized 6-methoxy - 2 - aminobenzothiazole or diazotized 6-ethoxy-2-aminobenzothiazole and a coupling component such as 1-amino-5-hydroxynaphthalene, py - 3 - hydroxytetrahydro - 7 - hydroxynaphthopyridine, py - tetrahydro - 7 - hydroxynaphthopyridine, 1-β-hydroxyethylamino-5 - hydroxynaphthalene, 1 - β,γ - dihydroxypropylamino - 5 - hydroxynaphthalene, 1 - dimethylamino - 5 - hydroxynaphthalene, 1 - (γ - chloro-2 - hydroxypropyl) - amino - 5 - hydroxy - naphthalene or py-tetrahydro-1-hydroxyethyl-3,7-dihydroxynaphthopyridine - chlorohydrate. These dyes have poor dyeing properties, have poor light-fastness properties, have but average gas-fastness properties and are expensive.

As well understood by those skilled in the dyeing art a need exists for compounds which will satisfactorily color cellulose acetate textile materials blue shades which have good fastness to light and gas. By "satisfactorily" is meant that the compound has good affinity, gives level dyeings, exhausts well, etc. As above indicated, azo compounds are known which color cellulose acetate textile materials blue shades but these compounds suffer from one or more drawbacks.

During our investigations to discover compounds which will color cellulose acetate we have made the discovery that when a 2-amino-5-nitrothiazole compound is diazotized and coupled with an aniline type coupling component there is a remarkable shift of color to the blue. Thus, when 2-aminothiazole is diazotized and coupled with N,N-di-β-hydroxyethylaniline a dye is obtained which colors cellulose acetate yellowish-red shades of no practical value. Similarly, when 4-methyl-2-aminothiazole is diazotized and coupled with N,N-di-β-hydroxyethylaniline the dye compound obtained colors cellulose acetate yellowish-red shades of no practical value. The color obtained with 2-aminothiazole is a little more orange than that obtained with 4-methyl-2-aminothiazole. In contrast, when 2-amino-5-nitrothiazole is diazotized and coupled with N,N-di-β-hydroxyethylaniline a reddish-blue dye is obtained which has excellent dyeing and gas fastness properties when applied to cellulose acetate and, so far as we are aware, the dyeings are as fast to light as the best blue azo dyes now available.

From the foregoing it is seen that the substitution of a nitro group for a hydrogen atom in the thiazole ring has shifted the color from yellowish-red to reddish-blue. By this means it is possible to make blue dyes from relatively simple intermediates such as N-ethyl-N-β,γ-dihydroxypropyl-m-toluidine, N-n-butyl-N-β,γ-dihydroxypropyl-m-toluidine, etc, and greenish-blue dyes from N,N-di-β-hydroxyethyl-2-methoxy-5-methylaniline, N,N-di-β-hydroxyethyl-2-methoxy-5-chloroaniline, etc., a feat of considerable theoretical and economic importance.

The azo compounds of our invention have the general formula:

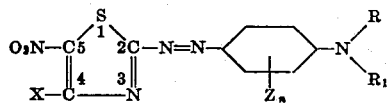

wherein R and R₁ each represents an alkyl group having 1 to 10, inclusive, carbon atoms, an alkoxyalkyl group having 3 to 6, inclusive, carbon atoms, a hydroxyalkyl group having 2 to 5, inclusive, carbon atoms, a cyanoalkyl group having 3 to 6, inclusive, carbon atoms, a sulfoalkyl group having 2 to 4, inclusive, carbon atoms, a sulfatoalkyl group having 2 to 5, inclusive, carbon atoms, a phosphatoalkyl group having 2 to 5, inclusive, carbon atoms, a phosphonoalkyl group having 2 to 5, inclusive, carbon atoms, a β-nitroethyl group, a chlorallyl group, an alkenyl group having 2 to 4, inclusive, carbon atoms or a (—CH$_2$)$_{n_1}$—COOR$_2$ group, wherein $n_1$ is a whole number selected from 1, 2 and 3 and R$_2$ represents an alkyl group having 1 to 4, inclusive, carbon atoms, X represents a hydrogen atom, an unsubstituted alkyl group having 1 to 6, inclusive, carbon atoms, a cyano group, a trifluoromethyl group or a

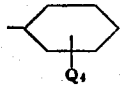

group, wherein Q$_4$ represents a hydrogen atom, a nitro group, a chlorine atom, a bromine atom, a fluorine atom or an alkyl group having 1 to 4, inclusive, carbon atoms, Z represents an alkyl group having 1 to 4, inclusive, carbon atoms, an alkoxy group having 1 to 4, inclusive, carbon atoms, a chlorine atom, a bromine atom, a fluorine atom, and a

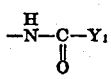

group, wherein Y$_1$ represents an alkyl group having 1 to 3, inclusive, carbon atoms and n is selected from 0, 1 and 2.

The compounds of our invention are useful for coloring textile materials made of or containing a cellulose carboxylic acid ester having two to four carbon atoms in the acid groups thereof. They are especially of use for the coloration of cellulose acetate textile materials. When applied to the aforesaid textile materials they give violet, reddish-blue, blue and blue-green dyeings which have good fastness to light and gas. The compounds of our invention also color wool, silk, nylon, polyethylene terephthalate and modified polyacrylonitrile textile materials similar colors but do not appear to be as good dyes for these latter materials as they are for cellulose acetate.

Our new dye compounds possess the further advantage that they are more readily discharged than any of the prior art dyes. Further, their rate of dyeing of cellulose acetate textile materials at temperatures between about 25° C. and 70° C. is far greater than any of the commercial azo blue cellulose acetate dyes now on the market; in fact, it is approximately equal to the best of the blue cellulose acetate anthraquinone dyes now for sale.

It is an object of our invention to provide new azo compounds. Another object is to provide a satisfactory process for the preparation of our new azo compounds. A further object is to provide dyed textile materials, especially cellulose acetate textile materials, which have good fastness to light and gas.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new azo compounds of our invention are prepared by diazotizing a 2-amino-5-nitrothiazole having the formula:

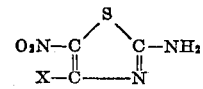

and coupling the diazonium compound obtained with a compound having the formula:

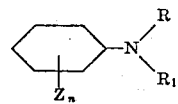

R, R$_1$, X, Z and n in the foregoing formulas, have the meaning previously assigned to them.

Typical of the 2-amino-5-nitrothiazole compounds used in the preparation of the azo compounds of our invention are: 2-amino-5-nitrothiazole, 2-amino-4-methyl-5-nitrothiazole, 2-amino-4-ethyl-5-nitrothiazole, 2 - amino - 4 - n - butyl - 5 - nitrothiazole, 2 - amino-4-n-hexyl-5-nitrothiazole, 2 - amino-4-cyano-5-nitrothiazole, 2-amino-4-trifluoromethyl - 5 - nitrothiazole, 2-amino-4-phenyl-5-nitrothiazole, 2-amino-4-(o-nitrophenyl)-5-nitrothiazole, 2-amino - 4 -(m - nitrophenyl)- 5 - nitrothiazole, 2 - amino - 4 -(p-nitrophenyl) - 5 - nitrothiazole, 2 - amino - 4 -(p-chlorophenyl)-5-nitrothiazole, 2 - amino - 4 -(o - bromophenyl)- 5 - nitrothiazole, 2 - amino-4-(o-fluorophenyl)-5-nitrothiazole, 2 - amino - 4 -(p - methylphenyl)-5-nitrothiazole and 2-amino-4-(p-n-butylphenyl)-5-nitrothiazole. The use of 2-amino-5-nitrothiazole is preferred.

Illustrative of the alkyl groups represented by R and $R_1$ are the methyl, the ethyl, the n-propyl, the isopropyl, the n-butyl, the n-amyl, the n-hexyl, the n-heptyl, the n-octyl, the n-nonyl and the n-decyl groups. Illustrative of the alkoxyalkyl groups represented by R and $R_1$ are the $\beta$-methoxyethyl, $\beta$-ethoxyethyl, $\beta$-n-propoxyethyl, $\beta$-n-butoxyethyl and the $\gamma$-n-propoxypropyl groups. Similarly, the $\beta$-hydroxyethyl, the $\beta$-hydroxypropyl, the $\gamma$-hydroxypropyl, the $\beta,\gamma$-dihydroxypropyl, the $\delta$-hydroxybutyl, the $\epsilon$-hydroxyamyl and the $\delta,\epsilon$-dihydroxyamyl groups are illustrative of the hydroxyalkyl groups R and $R_1$ represent. Illustrative of the cyanoalkyl groups R and $R_1$ represent are the $\beta$-cyanoethyl, the $\gamma$-cyanopropyl, the $\delta$-cyanobutyl and the $\epsilon$-cyanopentyl groups.

Sulfatoalkyl groups represented by R and $R_1$ include, for example, the $\beta$-sulfatoethyl, the $\beta$-sulfato-n-propyl, the $\gamma$-sulfatopropyl, sulfated $\beta,\gamma$-dihydroxypropyl, the $\delta$-sulfatobutyl and the $\epsilon$-sulfatoamyl groups. Illustrative phosphatoalkyl groups represented by R and $R_1$ are the $\beta$-phosphatoethyl group, the $\gamma$-phosphatopropyl group, the $\delta$-phosphatobutyl group and the $\epsilon$-phosphatoamyl groups. Phosphonoalkyl groups represented by R and $R_1$ include, for example, the $\beta$-phosphonoethyl, the $\gamma$-phosphonopropyl, the $\delta$-phosphonobutyl and the $\epsilon$-phosphonoamyl groups. The vinyl, the allyl, the methallyl and the crotyl groups are illustrative of the alkenyl groups R and $R_1$ represent. Illustrative of the $(-CH_2)_{n_1}-COOR_2$ groups R and $R_1$ represent are the $-CH_2COOCH_3$, the $-CH_2COOC_2H_5$, the $-CH_2COOCH_2CH_2CH_2CH_3$, the $-CH_2CH_2COOCH_3$ the $-CH_2CH_2COOC_2H_5$, the $-CH_2CH_2COOCH_2CH_2CH_2CH_3$ the $-CH_2CH_2CH_2COOCH_3$, the $-CH_2CH_2CH_2COOC_2H_5$ and the $-CH_2CH_2CH_2COOCH_2CH_2CH_2CH_3$ groups.

Similarly the methyl, the ethyl, the n-propyl, the isopropyl, the n-butyl, the secondary butyl and the tertiary butyl groups are illustrative of the alkyl groups represented by Z. Illustrative of alkoxy groups represented by Z are the methoxy, the ethoxy, the n-propoxy, the isopropoxy and the n-butoxy groups. The methyl, the ethyl, the n-propyl and the isopropyl groups are illustrative of the alkyl groups represented by $Y_1$.

The following examples illustrate the azo compounds of our invention and their manner of preparation:

EXAMPLE 1

A. Preparation of nitrosyl sulfuric acid 1.52 grams of sodium nitrite were added portionwise to 10 cc. of concentrated sulfuric acid with stirring and the temperature of the reaction mixture was allowed to rise to 65° C. The resulting solution was then cooled to 5° C. and 20 cc. of a mixture of 3 cc. of propionic acid and 17 cc. of acetic acid were added dropwise with stirring while allowing the temperature to rise to 15° C. and maintaining it at this temperature during the remainder of the addition.

B. Diazotization

The nitrosyl sulfuric acid mixture prepared as described above was cooled to 0° C.-5° C. and then 2.9 grams (0.02 mole) of 2-amino-5-nitrothiazole were added portionwise while stirring after which 20 cc. of the propionic-acetic acid mixture prepared as described above were added while keeping the temperature of the reaction mixture at 0° C.-5° C. The reaction mixture thus obtained was then stirred at about 0° C.-5° C. for three hours and excess sodium nitrite present in the mixture was destroyed by adding one to two grams of urea. A clear diazonium solution was obtained.

C. Coupling 12 cc. of the 2-amino-5-nitrothiazole diazonium solution prepared as described in B above were added with stirring at 0° C.-5° C. to a solution of 0.98 gram of N,N-di-$\beta$-hydroxyethyl-m-toluidine in 6 cc. of a 1:6 mixture of propionic acid-acetic acid (i. e. 1 part by volume of propionic acid to 6 parts by volume of acetic acid) cooled in an ice bath. After a short time the reaction mixture was made neutral to Congo paper by adding sodium acetate portionwise and the coupling reaction was allowed to proceed for two to three hours. The reaction mixture was then poured into ice water and after stirring a short time, it was filtered to recover the dye compound formed on the filter. The dye compound thus obtained was washed well with water and dried. 1.3 grams of the dye compound having the formula:

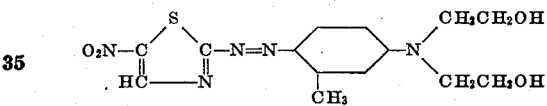

were obtained. This compound has excellent affinity for cellulose acetate fabrics and colors them a brilliant deep blue. The dye has excellent gas fastness and very good light fastness.

EXAMPLE 2

1.45 grams (0.01 mole) of 2-amino-5-nitrothiazole were added portionwise to 15 grams of concentrated $H_2SO_4$ cooled to 0° C.-5° C. To the solution thus obtained was added dropwise a nitrosyl sulfuric acid solution prepared by adding 0.76 gram of sodium nitrite portionwise to 5 cc. of concentrated sulfuric acid with stirring and allowing the temperature to rise to 65° C. followed by cooling to 5° C. The diazotization reaction which takes place was allowed to proceed for 3 hours at 0° C. A clear diazonium solution of 2-amino-5-nitrothiazole was obtained.

Three tenths of the diazonium solution prepared as described above was added with stirring to 0.65 gram of N,N-di-$\beta$-hydroxyethyl-m-chloroaniline dissolved in dilute sulfuric acid. The excess mineral acid was gradually neutralized with a concentrated aqueous sodium acetate solution until neutral to Congo and after 2 hours the precipitated dye was recovered by filtration, washed well with water and dried. The dye compound obtained has the formula:

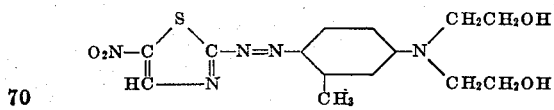

It colors cellulose acetate textile materials deep bluish-violet shades having excellent gas fastness and good light fastness and which show no crocking.

EXAMPLE 3

0.725 gram (0.005 mole) of 2-amino-5-nitrothiazole was diazotized in accordance with the general procedure described in Example 1 and the diazonium compound thus obtained was added with stirring at 0° C.–5° C. to a solution of 1.05 grams of N-ethyl-N-β,γ-dihydroxypropyl-m-toluidine in 10 cc. of a 1:6 mixture of propionic-acetic acid (i. e. a mixture consisting of one part by volume of propionic acid to 6 parts by volume of acetic acid) and cooled in an ice bath. After a short time the mineral acid in the reaction mixture was neutralized to Congo paper by the portionwise addition of sodium acetate and the coupling reaction was allowed to proceed for three hours more. Then the reaction mixture was poured into cold water (15° C.) and after stirring for a short time it was filtered and the product collected on the filter was washed well with water and dried. 1.28 grams of the dye having the formula:

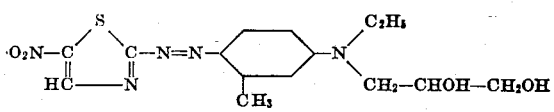

was obtained. It dyes cellulose acetate textile materials brilliant deep blue shades having good light fastness and excellent gas fastness. The dye also has excellent affinity and color value for cellulose acetate textile materials.

EXAMPLE 4

By the use of 1.12 grams of N-ethyl-N-(β-methyl-β,γ-dihydroxypropyl)-m-toluidine in place of N-ethyl-N-β,γ-dihydroxypropyl-m-toluidine in Example 3, 1.43 grams of a dye compound having the formula:

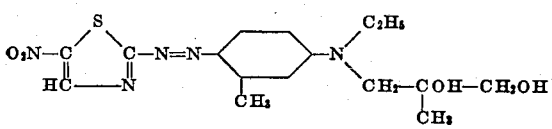

were obtained. The dye was obtained in the form of a dark powder and dyes cellulose acetate textile materials similar shades as the dye of Example 3. The fastness properties are the same as those of the dye of Example 3.

EXAMPLE 5

By the use of 1.25 grams of N-β,γ-dihydroxypropyl-N-β-methoxyethyl-m-toluidine in place of N-ethyl-N-β,γ-dihydroxypropyl-m-toluidine in Example 3, 1.38 grams of a dye which colors cellulose acetate textile materials bright deep shades of blue having good light and gas fastness properties were obtained. The dye compound of this example gives discharge prints which are clear and sharp.

EXAMPLE 6

By the use of 1.12 grams of N,N-bis-(β-methoxyethyl)-m-toluidine for N-ethyl-N-β,γ-dihydroxypropyl-m-toluidine in Example 3, 1.41 grams of a dye were obtained in the form of a fine dark powder. This dye compound dyes cellulose acetate textile materials light blue shades having good light fastness.

EXAMPLE 7

By the use of 1.55 grams (0.005 mole) of N-butyl-N-(β-sodium sulfatoethyl)-m-toluidine in place of N-ethyl-N-β,γ-dihydroxypropyl-m-toluidine in Example 3, 1.4 grams of a somewhat water-soluble dye were obtained. The dye was recovered from the reaction mixture by salting out with NaCl and filtered. It dyed cellulose acetate textile materials a light blue color having good light and gas fastness.

EXAMPLE 8

By the use of 1.68 grams (0.005 mole) of N-n-amyl-N-(β-sodium sulfatopropyl)-m-ethylaniline in place of N-ethyl-N-β,γ-dihydroxypropyl-m-toluidine in Example 3, 1.57 grams of a water-soluble dye that dyes cellulose acetate textile materials light blue shades having good light and gas fastness properties were obtained. The dye was recovered from the reaction mixture by salting out with NaCl and filtering.

EXAMPLE 9

By the use of 1.67 grams of N-β-cyanoethyl-N-(β-sodium phosphatoethyl)-m-chloroaniline in place of N-ethyl-N-β,γ-dihydroxypropyl-m-toluidine in Example 3, 1.4 grams of a water-soluble dye were obtained. The dye was recovered from the reaction mixture by salting out with NaCl and filtering. It colors cellulose acetate textile materials violet shades.

EXAMPLE 10

0.98 gram (0.005 mole) of 2-amino-5-nitro-4-trifluoromethylthiazole was diazotized in a nitrosylsulfuric acetic-propionic acid mixture in accordance with the general procedure described in Example 1.

To a solution of 0.97 gram of N-methyl-N-β,γ-dihydroxypropyl-m-toluidine in 10 cc. of a 1:6 mixture of propionic-acetic acid, cooled in an ice bath, was added the diazonium solution prepared as just described, with stirring, at 0° C.–5° C. After a short time the mineral acid in the reaction mixture was neutralized to Congo paper with sodium acetate and the coupling reaction was allowed to proceed for three hours longer. The reaction mixture was drowned in 200 cc. of cold water, filtered and the dye product recovered on the filter was washed well with water and dried. 1.62 grams of dye were obtained. It colors cellulose acetate textile materials deep blue shades that are fast to light and gas.

EXAMPLE 11

0.85 gram of 2-amino-4-cyano-5-nitrothiazole was diazotized in a nitrosylsulfuric acetic-propionic acid mixture using the general procedure described in Example 1. 1.13 grams of N-β-methoxyethyl-N-β,γ-dihydroxypropyl-m-toluidine were coupled with the diazonium solution prepared as described above in accordance with the procedure described in Example 10. 1.55 grams of dye were obtained as a dark powder. It colors cellulose acetate textile materials deep blue shades which are fast to gas and light.

EXAMPLE 12

1.33 grams (0.005 mole) of 2-amino-5-nitro-4-(m-nitrophenyl)-thiazole were diazotized in a nitrosylsulfuric acetic-propionic acid mixture in accordance with the general procedure described in Example 1. 1.05 grams of N-ethyl-N-β,γ-dihydroxypropyl-m-toluidine were coupled in accordance with the procedure described in Example 10 with the diazonium solution obtained as above described. 1.81 grams of a dye were obtained. The dye was obtained as a dark powder and colors cellulose acetate textile materials excellent blue-green shades which have excellent gas fastness and fair light fastness properties. Discharge prints obtained by the use of this dye were clear and sharp.

EXAMPLE 13

14.5 grams (0.1 mole) of 2-amino-5-nitrothiazole were dissolved in 145 grams of sulfuric acid and diazotized at −4° C. by adding dropwise a slight excess of nitrosyl sulfuric acid. The diazotization process took about one hour.

18.1 grams of N,N-di-β-hydroxyethylaniline were dissolved in 200 cc. of acetic acid and the diazonium solution prepared as described above was slowly added with stirring while keeping the reaction mixture cold. The coupling reaction which takes place was completed by adding sodium acetate to neutralize the mineral acid present. The dye compound formed was precipitated by drowning the reaction mixture in water and filtering. The dye compound recovered on the filter was washed well with water and dried. It colors cellulose acetate textile materials reddish-blue shades of good fastness to light and gas. In this as well as in the other examples, the neutralization of the mineral acid can be effected with an alkaline agent other than sodium acetate. Thus, potassium acetate or sodium carbonate, for example, can be used.

EXAMPLE 14

23 grams of N-ethyl-N-β-sulfoethylaniline were dissolved in 200 cc. of acetic acid and a diazonium solution prepared exactly as described in Example 13 was added slowly with stirring while maintaining the reaction mixture in a cooled condition. The coupling reaction which takes place was completed by adding sodium acetate to neutralize the mineral acid. Water was added to the reaction mixture to effect precipitation of the dye compound formed, following which the reaction mixture was washed with cold water and dried. The dye compound thus obtained colors cellulose acetate textile materials violet shades having good fastness to light and gas.

Example 15

14.5 grams of 2-amino-5-nitrothiazole were diazotized in accordance with the procedure described in Example 13 and the diazonium solution obtained was added slowly with stirring to 23.7 grams of N-n-butyl-N-β-hydroxy-β-ethoxyethyl-aniline. Coupling and recovery of the dye compound formed was carried out in accordance with the general procedure described in Example 13. The dye compound obtained colors cellulose acetate textile materials reddish-blue shades having good fastness to light and gas.

Example 16

By the use of 0.90 gram (0.005 mole) of N-ethyl-N-β-hydroxyethyl-m-toluidine in place of N,N-di-β-hydroxyethyl-m-toluidine in Example 1, a dye compound was obtained which colors cellulose acetate textile materials deep bright blue shades having excellent gas fastness and good light fastness.

Example 17

By the use of 1.19 grams (0.005 mole) of N-butyl - N - β,γ - dihydroxypropyl - m - toluidine in place of N,N-di-β-hydroxyethyl-m-toluidine in Example 1, a dye compound was obtained which dyes cellulose acetate textile materials deep bright blue shades having excellent gas fastness, good light fastness and good resistance to crocking. The dye has excellent affinity for the aforesaid material.

Example 18

0.5 gram (0.0025 mole) of N,N-di-β-hydroxyethyl-2-methoxy-5-chloroaniline was dissolved in 10 cc. of dilute sulfuric acid and cooled with crushed ice to 0° C. To this solution was added slowly and with stirring one-fourth of the diazonium solution prepared as described in Example 2. The excess acid present in the reaction mixture was slowly made neutral to Congo paper by the addition of sodium acetate and the coupling reaction was allowed to proceed for two hours longer. Then the reaction mixture was filtered and the dye compound recovered on the filter was washed well with water and dried. The dye compound was obtained as a dark blue solid. This dye has excellent affinity for cellulose acetate textile materials and colors them light blue shades having good gas and light fastness.

Example 19

0.63 gram of N-ethyl-N-β,γ-dihydroxypropyl-aniline dissolved in 10 cc. of dilute sulfuric acid was coupled with three-tenths of the diazonium solution prepared as described in Example 2. Coupling and recovery of the dye compound formed was carried out in accordance with the general procedure described in Example 2. The dye compound obtained colors cellulose acetate textile materials brilliant deep blue shades having good light fastness and excellent gas fastness.

Example 20

1.59 grams (0.01 mole) of 2-amino-4-methyl-5-nitrothiazole were diazotized and the diazonium compound obtained was coupled with 1.81 grams of N,N-di-β-hydroxyethylaniline. Diazotization, coupling and recovery of the dye compound formed were carried out in accordance with the general procedure described in Example 1. The dye compound obtained colors cellulose acetate textile materials bluish-violet shades.

By the use of 1.73 grams of 2-amino-4-ethyl-5-nitrothiazole a dye compound is obtained which colors cellulose acetate textile materials bluish-violet shades.

Example 21

2.01 grams (0.01 mole) of 2-amino-4-(n-butyl)-5-nitrothiazole were diazotized and the diazonium compound obtained was coupled with 2.45 grams (0.01 mole) of N-ethyl-N-β-hydroxyethyl-m-bromoaniline. Diazotization, coupling and recovery of the dye compound formed were carried out in accordance with the general procedure described in Example 1. The dye compound obtained colors cellulose acetate textile materials violet shades.

By the use of 2.29 grams of 2-amino-4-(n-hexyl)-5-nitrothiazole in the above example a dye compound is obtained which colors cellulose acetate textile materials violet shades.

Example 22

2.22 grams (0.01 mole) of 2-amino-4-phenyl- 5-nitrothiazole were diazotized and the diazonium compound obtained was coupled with 1.81 grams of N,N-di-β-hydroxyethylaniline. Diazotization, coupling and recovery of the dye compound formed were carried out in accordance with the general procedure described in Example 1. The dye compound obtained colors cellulose acetate textile materials blue shades.

By the use of 2.36 grams of 2-amino-4-(o-methylphenyl)-5-nitrothiazole and 2.78 grams of 2-amino-4-(p-n-butylphenyl)-5-nitrothiazole, respectively, in the above example, dye compounds are obtained which color cellulose acetate textile materials blue shades.

*Example 23*

2.57 grams (0.01 mole) of 2-amino-4-(o-chlorophenyl)-5-nitrothiazole were diazotized and the diazonium compound obtained was coupled with 1.81 grams of N,N-di-β-hydroxyethylaniline. Diazotization, coupling and recovery of the dye compound formed were carried out in accordance with the general procedure described in Example 1. The dye compound obtained colors cellulose acetate textile materials blue shades.

By the use of 3.01 grams (0.01 mole) of 2-amino-4-(o-bromophenyl)-5-nitrothiazole and 2.40 grams (0.01 mole) of 2-amino-4-(p-fluorophenyl)-5-nitrothiazole, respectively, in the above example, dye compounds are obtained which color cellulose acetate textile materials blue shades.

*Example 24*

1.45 grams (0.01 mole) of 2-amino-5-nitrothiazole were diazotized and the diazonium compound obtained was coupled with 2.09 grams (0.01 mole) of N-β-hydroxyethyl-N-β-ethoxyethylaniline. Diazotization, coupling and recovery of the dye compound formed were carried out in accordance with the general procedure described in Example 1. The dye compound obtained colors cellulose acetate textile materials blue shades.

By the use of 2.37 grams of N-β-hydroxyethyl-N-β-(n-butoxy)ethylaniline in the above example a dye compound is obtained which colors cellulose acetate textile materials blue shades.

*Example 25*

1.45 grams of 2-amino-5-nitrothiazole were diazotized and the diazonium compound obtained was coupled with 1.65 grams (0.01 mole) of N-ethyl-N-β-hydroxyethylaniline. Diazotization, coupling and recovery of the dye compound formed were carried out in accordance with the general procedure described in Example 1. The dye compound obtained colors cellulose acetate textile materials blue shades.

By the use of 1.95 grams of N-ethyl-N-γ-hydroxypropylaniline and 2.09 grams of N-ethyl-N-δ-hydroxybutylaniline, respectively, in the above example dye compounds are obtained which color cellulose acetate textile materials blue shades.

*Example 26*

1.45 grams of 2-amino-5-nitrothiazole were diazotized and the diazonium compound obtained was coupled with 2.22 grams (0.01 mole) of N-ethyl-N-4,5-dihydroxyamylaniline. Diazotization, coupling and recovery of the dye compound formed were carried out in accordance with the general procedure described in Example 1. The dye compound obtained colors cellulose acetate textile materials blue shades.

By the use of 2.07 grams of N-ethyl-N-ε-hydroxyamylaniline in the above example a dye compound is obtained which colors cellulose acetate textile materials blue shades.

*Example 27*

1.98 grams of 2-amino-4-trifluoromethyl-5-nitrothiazole were diazotized and the diazonium compound obtained was coupled with 1.90 grams (0.01 mole) of N-β-hydroxyethyl-N-β-cyanoethylaniline. Diazotization, coupling and recovery of the dye compound formed were carried out in accordance with the general procedure described in Example 1. The dye compound obtained colors cellulose acetate textile materials reddish-blue shades.

By the use of 2.04 grams of N-β-hydroxyethyl-N-γ-cyanopropylaniline and 2.32 grams of N-β-hydroxyethyl-N-ε-cyanopentylaniline, respectively, in the above example dye compounds are obtained which color cellulose acetate textile materials blue shades.

*Example 28*

1.45 grams of 2-amino-5-nitrothiazole were diazotized and the diazonium compound obtained was coupled with 2.1 grams (0.01 mole) of N-β-hydroxyethyl-N-β-nitroethylaniline. Diazotization, coupling and recovery of the dye compound formed were carried out in accordance with the general procedure described in Example 1. The dye compound obtained colors cellulose acetate textile materials bluish-violet shades.

*Example 29*

1.7 grams (0.01 mole) of 2-amino-4-cyano-5-nitrothiazole were diazotized and the diazonium compound obtained was coupled with 1.98 grams of N-β-hydroxyethyl-N-β-chlorallylaniline. Diazotization, coupling and recovery of the dye compound formed were carried out in accordance with the general procedure described in Example 1. The dye compound obtained colors cellulose acetate textile materials reddish-blue shades.

*Example 30*

1.45 grams of 2-amino-5-nitrothiazole were diazotized and the diazonium compound obtained was coupled with 1.63 grams of N-β-hydroxyethyl-N-allylaniline. Diazotization, coupling and recovery of the dye compound formed were carried out in accordance with the general procedure described in Example 1. The dye compound obtained colors cellulose acetate textile materials violet shades.

By the use of 1.77 grams of N-β-hydroxyethyl-N-crotylaniline in the above example a dye compound is obtained which colors cellulose acetate textile materials violet shades.

*Example 31*

1.45 grams of 2-amino-5-nitrothiazole were diazotized and the diazonium compound obtained was coupled with 2.07 grams (0.01 mole) of N-CH$_2$CH$_2$COOCH$_3$-N-ethylaniline. Diazotization, coupling and recovery of the dye compound formed were carried out in accordance with the general procedure described in Example 1. The dye compound obtained colors cellulose acetate textile materials violet shades.

By the use of 2.21 grams of N-CH$_2$CH$_2$COOCH$_3$-N-ethylaniline in the above example a dye compound is obtained which colors cellulose acetate textile materials violet shades.

Example 32

1.45 grams of 2-amino-5-nitrothiazole were diazotized and the diazonium compound obtained was coupled with 2.51 grams (0.01 mole) of N-CH₂CH₂CH₂COOCH₃ - N - β - hydroxyethyl-m-toluidine. Diazotization, coupling and recovery of the dye compound formed were carried out in accordance with the general procedure described in Example 1. The dye compound obtained colors cellulose acetate textile materials reddish-blue shades.

By the use of 2.93 grams of

N-CH₂CH₂COOCH₂CH₂CH₂CH₃-N-
β-hydroxyethyl-m-toluidine in the above example a dye compound is obtained which colors cellulose acetate textile materials reddish-blue shades.

Example 33

1.45 grams of 2-amino-5-nitrothiazole were diazotized and the diazonium compound obtained was coupled with 1.99 grams (0.01 mole) of N,N-di-β-hydroxyethyl-m-fluoroaniline. Diazotization, coupling and recovery of the dye compound formed were carried out in accordance with the general procedure described in Example 1. The dye compound obtained colors cellulose acetate textile materials violet shades.

Example 34

1.45 grams of 2-amino-5-nitrothiazole were diazotized and the diazonium compound obtained was coupled with 2.07 grams (0.01 mole) of N-(n-amyl)-N-β-hydroxyethylaniline. Diazotization, coupling and recovery of the dye compound formed were carried out in accordance with the general procedure described in Example 1. The dye compound obtained colors cellulose acetate textile materials blue shades.

By the use of 2.21 grams of N-(n-hexyl)-N-β-hydroxyethylaniline in the above example a dye compound is obtained which colors cellulose acetate texitle materials blue shades.

Example 35

1.45 grams of 2-amino-5-nitrothiazole were diazotized and the diazonium compound obtained was coupled with 2.09 grams of N-ethyl-N-β-hydroxyethyl-m-ethoxyaniline. Diazotization, coupling and recovery of the dye compound formed were carried out in accordance with the general procedure described in Example 1. The dye compound obtained colors cellulose acetate textile materials blue shades.

By the use of 2.37 grams of N-ethyl-N-β-hydroxyethyl-m-(n-butoxy)aniline in the above example a dye compound is obtained which colors cellulose acetate textile materials blue shades.

Example 36

1.45 grams of 2-amino-5-nitrothiazole were diazotized and the diazonium compound obtained was coupled with 2.77 grams (0.01 mole) of N-(n-decyl)-N-β-hydroxyethylaniline. Diazotization, coupling and recovery of the dye compound formed were carried out in accordance with the general procedure described in Example 1. The dye compound obtained colors cellulose acetate textile materials blue shades.

By the use of 2.35 grams of N-(n-heptyl)-N-β-hydroxyethylaniline in the above example a dye compound is obtained which colors cellulose acetate textile materials blue shades.

Example 37

1.45 grams of 2-amino-5-nitrothiazole were diazotized and the diazonium compound obtained was coupled with 2.97 grams (0.01 mole) of N-(sodium-δ-sulfatobutyl)-N-ethylaniline. Diazotization, coupling and recovery of the dye compound formed were carried out in accordance with the procedure used in Example 8. The dye compound obtained colors cellulose acetate textile materials reddish-blue shades.

By the use of 3.11 grams of N-(sodium-ε-sulfatoamyl)-N-ethylaniline in the above example a dye compound is obtained which colors cellulose acetate textile materials reddish-blue shades.

Example 38

1.45 grams of 2-amino-5-nitrothiazole were diazotized and the diazonium compound obtained was coupled with 2.81 grams (0.01 mole) of N-(sodium-δ-sulfobutyl)-N-ethylaniline. Diazotization, coupling and recovery of the dye compound formed were carried out in accordance with the procedure used in Example 8. The dye compound obtained colors cellulose acetate textile materials reddish-blue shades.

By the use of 2.67 grams of N-(sodium-γ-sulfopropyl)-N-ethylaniline in the above example a dye compound is obtained which colors cellulose acetate textile materials reddish-blue shades.

Example 39

1.45 grams of 2-amino-5-nitrothiazole were diazotized and the diazonium compound obtained was coupled with 2.59 grams of N-(disodium-β-phosphonoethyl)-N-ethylaniline. Diazotization, coupling and recovery of the dye compound formed were carried out in accordance with the procedure used in Example 8. The dye compound obtained colors cellulose acetate textile materials violet shades.

By the use of 3.01 grams of N-(disodium-ε-phosphonoamyl)-N-methylaniline a dye compound is obtained which colors cellulose acetate textile materials violet shades.

Example 40

1.45 grams of 2-amino-5-nitrothiazole were diazotized and the diazonium compound obtained was coupled with 2.89 grams (0.01 mole) of N - (disodium - β - phosphatoamyl) - N - ethyl - aniline. Diazotization, coupling and recovery of the dye compound formed were carried out in accordance with the procedure used in Example 8. The dye compound obtained colors cellulose acetate textile materials reddish-blue shades.

By the use of 3.31 grams of N-(disodium-n-ε-phosphatoamyl)-N-ethylaniline a dye compound is obtained which colors cellulose acetate textile materials reddish-blue shades.

Example 41

1.45 grams of 2-amino-5-nitrothiazole were diazotized and the diazonium compound obtained was coupled with 2.26 grams (0.01 mole) of N,N-di-β-hydroxyethyl-m-ethoxyaniline. Diazotization, coupling and recovery of the dye compound formed were carried out in accordance with the general procedure described in Example 1. The dye compound obtained colors cellulose acetate textile materials reddish-blue shades.

By the use of 2.40 grams of N,N-di-β-hydroxyethyl-m-n-propoxyaniline and 2.56 grams of N,N-di-β-hydroxyethyl-m-n-butoxyaniline, respectively, in the above example dye compounds are obtained which color cellulose acetate textile materials reddish-blue shades.

*Example 42*

1.45 grams of 2-amino-5-nitrothiazole were diazotized and the diazonium compound obtained was coupled with 2.38 grams (0.01 mole) of N,N-di-β-hydroxyethyl-m-acetaminoaniline. Diazotization, coupling and recovery of the dye compound formed were carried out in accordance with the general procedure described in Example 1. The dye compound obtained colors cellulose acetate textile materials blue shades.

By the use of 2.52 grams of N,N-di-β-hydroxyethyl-m-propionylaniline and 2.66 grams of N,N-di-β-hydroxyethyl-m-butyrylaniline, respectively, in the above example dye compounds are obtained which color cellulose acetate textile materials blue shades.

*Example 43*

1.45 grams of 2-amino-5-nitrothiozole were diazotized and the diazonium compound obtained was coupled with 2.43 grams of

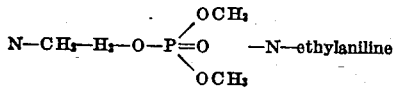

Diazotization, coupling and recovery of the dye compound formed were carried out in accordance with the general procedure described in Example 1. The dye compound obtained colors cellulose acetate textile materials reddish-blue shades.

By the use of 2.71 grams of

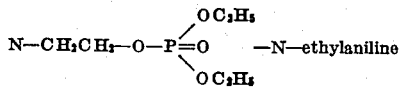

in the above example a dye compound is obtained which colors cellulose acetate textile materials reddish-blue shades.

*Example 44*

1.45 grams of 2-amino-5-nitrothiazole were diazotized and the diazonium compound obtained was coupled with 2.27 grams of

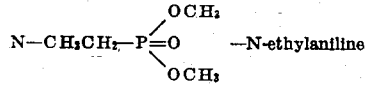

Diazotization, coupling and recovery of the dye compound formed were carried out in accordance with the general procedure described in Example 1. The dye compound obtained colors cellulose acetate textile materials violet shades.

By the use of 2.55 grams of

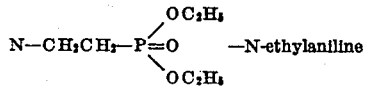

in the above example a dye compound is obtained which colors cellulose acetate textile materials violet shades.

The compounds tabulated hereinafter further illustrate the compounds of our invention. These compounds are prepared by diazotizing 2-amino-5-nitrothiazole and coupling the diazonium compound obtained with the coupling components named hereinafter. The color given is that which the dye colors cellulose acetate. The diazotization, coupling and recovery operations are carried out in accordance with the procedure described hereinbefore.

| Coupling Component | Color |
|---|---|
| N,N-dimethylaniline | blue. |
| N,N-diethylaniline | Do. |
| N,N-di(n-butyl)aniline | Do. |
| N,N-di(n-amyl)aniline | Do. |
| N,N-diallylaniline | Do. |
| N,N-dimethallylaniline | Do. |
| N,N-dicrotylaniline | Do. |
| N-allyl-N-methylaniline | Do. |
| N-methyl-N-ethylaniline | Do. |
| N-methyl-N-n-propylaniline | Do. |
| N-methyl-N-n-butylaniline | Do. |
| N-methyl-N-n-amylaniline | Do. |
| N-ethyl-N-n-hexylaniline | Do. |
| N-methyl-N-isopropylaniline | Do. |
| N-methyl-N-β-hydroxyethylaniline | Do. |
| N-ethyl-N-β-hydroxyethylaniline | Do. |
| N-n-propyl-N-β-hydroxyethylaniline | Do. |
| N-n-butyl-N-β-hydroxyethylaniline | Do. |
| N-allyl-N-β-hydroxyethylaniline | Do. |
| N-β-cyanoethyl-N-β-hydroxyethylaniline | violet. |
| N-β-carbethoxyethyl-N-β-hydroxyethylaniline | Do. |
| N-β-sulfoethyl-N-β-hydroxyethylaniline | Do. |
| N-β-sulfatoethyl-N-β-hydroxyethylaniline | Do. |
| N-β-phosphatoethyl-N-β-hydroxyethylaniline | Do. |
| N-γ-sulfatopropyl-N-β-hydroxyethylaniline | Do. |
| N-β-nitroethyl-N-β-hydroxyethylaniline | Do. |
| N,N-di-β-hydroxyethylaniline | reddish-blue. |
| N,N-di-β-hydroxyethyl-m-toluidine | blue. |
| N,N-di-β-hydroxyethyl-m-chloroaniline | violet. |
| N,N-di-β-hydroxyethyl-m-methoxyaniline | blue. |
| N,N-di-β-hydroxyethyl-2-methoxy-5-chloroaniline | green. |
| N,N-di-β-hydroxyethyl-2-methoxy-5-methylaniline | Do. |
| N,N-di-β-hydroxyethyl-2-ethoxy-5-acetaminoaniline | Do. |
| N,N-di-β-hydroxyethyl-3,5-dimethylaniline | blue. |
| N,N-di-β-hydroxyethyl-3,5-dimethoxyaniline | Do. |
| N,N-di-β-hydroxyethyl-2-β-hydroxyethoxy-5-bromoaniline | Do. |
| N,N-di-β-hydroxyethyl-2-chloro-5-ethoxyaniline | Do. |
| N-ethyl-N-β-hydroxyethyl-m-bromoaniline | bluish-violet. |
| N,N-di-β-methoxyethyl-m-toluidine | blue. |
| N,N-di-γ-hydroxypropyl-n-toluidine | Do. |
| N,N-di-β-hydroxypropyl-m-toluidine | Do. |
| N-n-propyl-N-β,γ-dihydroxypropylaniline | Do. |
| N-n-propyl-N-β,γ-dihydroxypropyl-m-toluidine | Do. |
| N-ethyl-N-β-sulfoethyl-m-toluidine | reddish-blue. |
| N-n-butyl-N-β-phosphonoethyl-m-toluidine | Do. |
| N-n-amyl-N-β-sulfatopropyl-m-toluidine | Do. |
| N-β-hydroxyethyl-N-β-cyanoethyl-m-toluidine | Do. |
| N-methyl-N-4,5-dihydroxyamylaniline | blue. |
| N-isopropyl-N-4,5-dihydroxyamyl-m-toluidine | Do. |
| N-ethyl-N-β,γ-dihydroxypropyl-3-tertiary butylaniline | Do. |
| N-γ-hydroxypropyl-N-β-methoxyethyl-m-toluidine | Do. |
| N-γ-hydroxypropyl-N-γ-methoxypropyl-m-toluidine | Do. |
| N,N-di-γ-methoxypropyl-m-toluidine | Do. |
| N,N-di-β-hydroxyethyl-3,5-dimethylaniline | Do. |
| N-allyl-N-β,γ-dihydroxypropyl-m-toluidine | reddish-blue. |
| N-γ-chlorallyl-N-β,γ-dihydroxypropyl-m-toluidine | Do. |

When 2-amino-4-methyl-5-nitrothiazole is substituted for 2-amino-5-nitrothiazole, the color of the corresponding dyes is somewhat redder. However, when 2-amino-4-cyano-5-nitrothiazole, 2-amino-4-phenyl-5-nitrothiazole, 2-amino-4-trifluoromethyl-5-nitrothiazole or 2-amino-4-(m-nitrophenyl)-5-nitrothiazole, respectively, are employed instead of 2-amino-5-nitrothiazole, the color of the dye compounds obtained shifts markedly to the green.

The sulfatoalkyl, the sulfoalkyl, the phosphatoalkyl and the phosphonoalkyl groups which may be present in our new dye compounds can be present in their free acid form or any suitable salt form such as, for example, the Na, K, $NH_4$, Mg, Ca or Li salt form.

In order that the preparation of the azo compounds of our invention may be entirely clear the preparation of certain intermediates used in their manufacture is described hereinafter.

*2-amino-4-phenylthiazole*

160 grams of bromine were added dropwise, with stirring, to a slurry of 120 grams of acetophenone and 152 grams of thiourea in a suitable reaction vessel. Heat was evolved and stirring became difficult.

The reaction mixture was heated on a steam bath overnight after which 2.5 liters of hot water (85° C.→) were added. The reaction mixture was stirred to effect solution and then filtered while hot. On cooling the hydrobromide salt of 2-amino-4-phenylthiazole crystallized. Then concentrated ammonium hydroxide was added to the cold reaction mixture until it became slightly alkaline. The reaction mixture was filtered and the 2-amino-4-phenylthiazole collected on the filter was washed once with water and dried. A yield of 126 grams was thus obtained. Upon recrystallization from ethyl alcohol 2-amino-4-phenylthiazole melting at 144° C.–146° C. was obtained.

*2-amino-4-(m-nitrophenyl) thiazole*

160 grams of bromine were added dropwise, with stirring, to a mixture of 165 grams of m-nitroacetophenone and 152 grams of thiourea in a suitable reaction vessel. Toward the end of the gromine addition the reaction mixture became a slurry.

After heating on a steam bath overnight, the reaction product was dissolved by pouring the reaction mixture into 4 liters of hot water and the resulting solution was filtered while hot. Upon cooling the hydrobromide salt of 2-amino-4-(m-nitrophenyl) thiazole crystallized. Then concentrated ammonium hydroxide was added to the cold reaction mixture until it became slightly alkaline. The reaction mixture was filtered and the 2-amino-4-(m-nitrophenyl) thiazole collected on the filter was washed once with water and dried. The yield of crude product was 87% of the theory. Upon recrystallization twice from ethyl alcohol 2 - amino - 4 - (m - nitrophenyl) thiazole melting at 178° C.–180° C. was obtained.

*2-amino-4-(m-nitrophenyl) -5-nitrothiazole*

60 grams of 2-amino-4-(m-nitrophenyl)thiazole were dissolved at 15° C. in 300 cc. of $H_2SO_4$. 13.3 cc. of fuming nitric acid (90%, density 1.5, 5% excess) were added at 10° C.–15° C. and the reaction mixture was allowed to stand overnight. Then the reaction mixture was stirred into ice and the reaction product filtered off. The reaction product was slurried with sodium bicarbonate until neutral and then with water. Upon recrystallization from nitrobenzene the 2-amino-4-(m-nitrophenyl)-5-nitrothiazole reaction product melted at 236–237° C.

*2-acetamido-4-phenylthiazole*

15 grams of 2-amino-4-phenylthiazole were heated on a steam bath with 50 cc. of acetic anhydride. Solution first occurred and then the reaction product precipitated. The reaction mixture was cooled, poured into water and stirred until excess acetic anhydride had reacted. Then the reaction mixture was filtered and the 2-acetamido-4-phenylthiazole collected on the filter was dried. Upon recrystallization from ethyl alcohol it melted at 206° C.–208° C.

*2-amino-4-phenyl-5-nitrothiazole*

The 2-acetamido-4-phenylthiazole prepared as described above was nitrated in sulfuric acid with fuming nitric acid in accordance with the procedure described in connection with 2-amino-4-(m-nitrophenyl)-5-nitrothiazole. Upon recrystallization from an acetic acid-water mixture the 2-acetamido - 4 - phenyl - 5 - nitrothiazole reaction product melted at 215° C.–224° C. 7 grams of the acetamido reaction product were hydrolyzed to the amino compound using 45 cc. of HCl, 90 cc. of $H_2O$ and 90 cc. of acetic acid. The 2-amino-4-phenyl-5-nitrothiazole thus obtained was recrystallized from nitrobenzene. The purified product sintered and darkened at 245° C. and decomposed at 260° C.

*2-amino-4-trifluoromethylthiazole*

This compound was prepared by reacting 14 grams (0.0955 mole) of 3-chloro-1,1,1-trifluoro-2-propanone and 7.26 grams of thiourea in 50 cc. of water for 4 hours on a steam bath. After making the reaction mixture slightly basic with sodium carbonate a yellow precipitate of 2-amino-4-trifluoromethylthiazole formed and was recovered by filtration and dried. It melted at 58° C.–60° C.

*2-amino-4-trifluoromethyl-5-nitrothiazole*

This compound is prepared by nitrating 2-amino-4-trifluoromethylthiazole at 5° C.–10° C. in sulfuric acid with fuming nitric acid and allowing the reaction mixture to warm to room temperature overnight. The reaction mixture is then drowned on ice, neutralized with sodium carbonate and the precipitated 2-amino-4-trifluoromethyl - 5 - nitrothiazole is filtered off, washed with water and dried.

*2-amino-4-cyanothiazole*

This compound is prepared by reacting equal molar quantities of thiourea and bromopyruvonitrile in ethyl alcohol.

*2-amino-4-cyano-5-nitrothiazole*

This compound is prepared by nitrating 2-amino-4-cyanothiazole at 5° C.–10° C. in sulfuric acid with fuming nitric acid and allowing the reaction mixture to warm to room temperature overnight. The reaction mixture is then drowned on ice, neutralized with sodium carbonate and the precipitated 2-amino-4-cyano-5-nitrothiazole is filtered off, washed with water and dried.

The azo dye compounds of our invention can be applied to the textile materials named hereinbefore in the form of an aqueous dispersion and are ordinarily so applied. To illustrate, the dye compound is finely ground with a dispersing agent such as sodium lignum sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

We claim:

1. The azo compounds having the general formula:

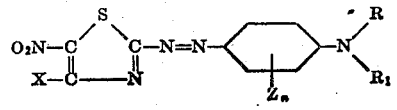

wherein R and R₁ each represents a member selected from the group consisting of an alkyl group having 1 to 10, inclusive, carbon atoms, an alkoxyalkyl group having 3 to 6, inclusive, carbon atoms, a hydroxyalkyl group having 2 to 5, inclusive, carbon atoms, a cyanoalkyl group having 3 to 6, inclusive, carbon atoms, a sulfoalkyl group having 2 to 4, inclusive, carbon atoms, a sulfatoalkyl group having 2 to 5, inclusive, carbon atoms, a phosphatoalkyl group having 2 to 5, inclusive, carbon atoms, a phosphonoalkyl group having 2 to 5, inclusive, carbon atoms, a β-nitroethyl group, a chlorallyl group, an alkenyl group having 2 to 4, inclusive, carbon atoms and a (—CH₂)n₁—COOR₂ group, wherein n₁ is a whole number selected from 1, 2 and 3 and R₂ represents an alkyl group having 1 to 4, inclusive, carbon atoms, X represents a member selected from the group consisting of a hydrogen atom, an unsubstituted alkyl group having 1 to 6, inclusive, carbon atoms, a cyano group, a trifluoromethyl group and a

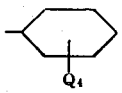

group, wherein Q₄ represents a member selected from the group consisting of a hydrogen atom, a nitro group, a chlorine atom, a bromine atom, a fluorine atom and an alkyl group having 1 to 4, inclusive, carbon atoms, Z represents a member selected from the group consisting of an alkyl group having 1 to 4, inclusive, carbon atoms, an alkoxy group having 1 to 4, inclusive, carbon atoms, a chlorine atom, a bromine atom, a fluorine atom, and a

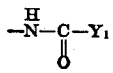

group, wherein Y₁ represents an alkyl group having 1 to 3, inclusive, carbon atoms and n is selected from 0, 1 and 2.

2. The azo compounds having the general formula:

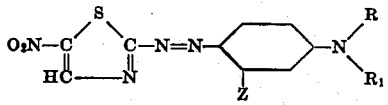

wherein R and R₁ each represents a hydroxyalkyl group having 2 to 5, inclusive, carbon atoms and Z represents an alkyl group having 1 to 4, inclusive, carbon atoms.

3. The azo compounds having the general formula:

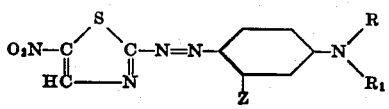

wherein R represents an alkyl group having 1 to 10, inclusive, carbon atoms, R₁ represents a hydroxyalkyl group having 2 to 5, inclusive, carbon atoms and Z represents an alkyl group having 1 to 4, inclusive, carbon atoms.

4. The azo compounds having the general formula:

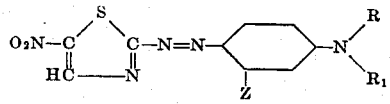

wherein R and R₁ each represents a hydroxyalkyl group having 2 to 5, inclusive, carbon atoms and Z represents a halogen atom having an atomic weight of from 19 to 80.

5. The azo compound having the formula:

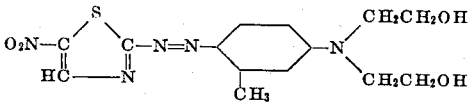

6. The azo compound having the formula:

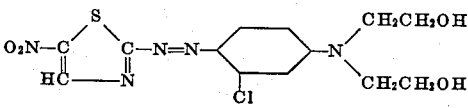

7. The azo compound having the formula:

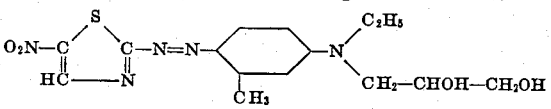

8. The azo compound having the formula:

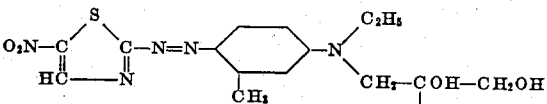

9. The azo compound having the formula:

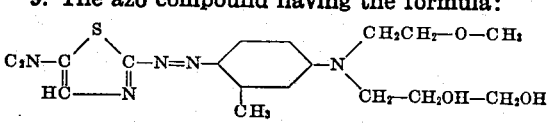

JOSEPH B. DICKEY.
EDMUND B. TOWNE.

References Cited in the file of this patent
UNITED STATES PATENTS

| Number | Name | Date |
|---|---|---|
| 2,433,388 | Newbery | Dec. 30, 1947 |

FOREIGN PATENTS

| Number | Country | Date |
|---|---|---|
| 440,113 | Great Britain | Dec. 20, 1935 |
| 587,134 | Great Britain | Apr. 15, 1947 |